US006999753B2

(12) United States Patent
Beckmann et al.

(10) Patent No.: US 6,999,753 B2
(45) Date of Patent: Feb. 14, 2006

(54) METHOD, SUBSCRIBER DEVICE AND RADIO COMMUNICATION SYSTEM FOR TRANSMITTING GROUP MESSAGES

(75) Inventors: Mark Beckmann, Braunschweig (DE); Michael Eckert, Braunschweig (DE); Martin Hans, Hildesheim (DE); Andreas Otte, Celle (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/486,293

(22) PCT Filed: Aug. 5, 2002

(86) PCT No.: PCT/EP02/08735

§ 371 (c)(1), (2), (4) Date: Mar. 24, 2004

(87) PCT Pub. No.: WO01/31968

PCT Pub. Date: May 3, 2001

(65) Prior Publication Data

US 2004/0176112 A1 Sep. 9, 2004

(30) Foreign Application Priority Data

Aug. 7, 2001 (EP) .................................. 01119060

(51) Int. Cl.
*H04Q 7/20* (2006.01)

(52) U.S. Cl. .................... 455/412.2; 455/458; 455/518

(58) Field of Classification Search ............. 455/412.2, 455/458, 515, 518, 519
See application file for complete search history.

(56) References Cited

U.S. PATENT DOCUMENTS

| | | | | |
|---|---|---|---|---|
| 5,465,391 | A | 11/1995 | Toyryla | |
| 5,923,649 | A | 7/1999 | Raith | |
| 6,363,258 | B1 * | 3/2002 | Schmidt et al. | 455/514 |
| 6,516,200 | B1 * | 2/2003 | Schmidt et al. | 455/518 |

FOREIGN PATENT DOCUMENTS

| | | |
|---|---|---|
| WO | WO 01/31968 | 5/2001 |

* cited by examiner

*Primary Examiner*—Erika A. Gary
(74) *Attorney, Agent, or Firm*—Bell, Boyd, & Lloyd LLC

(57) ABSTRACT

The invention is characterized in that for the purpose of sending an information to at least one group (MC1) of one or more subscriber devices of a radio communication system (FCS) regarding the presence of at least one group message (GN1) at least one common group paging indicator signal (GPI1) is additionally transmitted by one network element (BS1) to the subscriber devices of the respective group (MC1) and displayed.

9 Claims, 13 Drawing Sheets

FIG 5A

Secondary CCPCH system information

Figure 1:
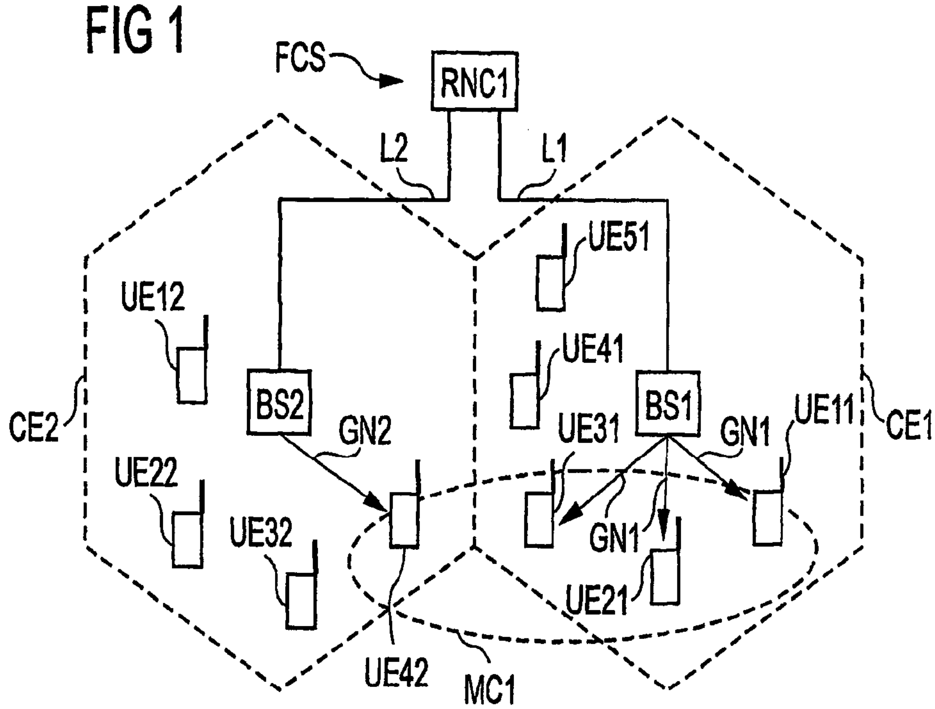

| Information element | Require-ment | Multi | Type and reference | Semantics description |
|---|---|---|---|---|
| Secondary CCPCH system information | MP | ((1 to <max SCCPCH>) | | |
| >Secondary CCPCH info | MP | | Secondary CCPCH info. 10.3.6.17 | |
| >TFCS | MD | | Transport format combination set 10.3.5.20 | For FACHs and PCH the default values is the value of "TFCS" for the previous SCCPCH in the list<br><br>(note: First appearance is then MP) |
| >FAC/PCH information | MD | 1 to <max FACHPCH | | Default value is the value of "FACH/PCH" for the previous SCCPCH in the list<br><br>(note: First appearance is then MP) |
| >> Transport channel identity | MP | | Transport channel identity 10.3.5.18 | |

FIG 5B

Secondary CCPCH system information

| Information element | Require-ment | Multi | Type and reference | Semantics description |
|---|---|---|---|---|
| >>TFS | MP | | Transport format set 10.3.5.23 | For each FACH and PCH Note 2 |
| >>CTCH indicator | MP | | Boolean | The value "TRUE" indicated that a CTCH will be mapped onto the FACH, and "FALSE" that no CTCH will be mapped |
| >PICH info. | OP | | PICH info. 10.3.6.49 | PICH info is only present if PCH will be multiplexed on second CCPCH |
| >Group Service Indicator GSI | OP | | Boolean | Group Service Indicator is only present if PCH will be multiplexed on CCPCH. Indicates which SCCPCH and which assigned PICH will be used to transfer group service information. |

FIG 6A

PICH info. (system information)

| Information element | Require-ment | Multi | Type and reference | Semantics description |
|---|---|---|---|---|
| CHOICE mode | MP | | | |
| >FDD | | | | |
| >>Channelization code | MP | | Integer (0..255) | SF is fixed and equal to 256 |
| >>Number of PI per frame | MP | | Integer (18,36, 72, 144) | |
| >>STTD indicator | MP | | STTD Indicator 10.3.6.78 | |
| >> Group PI (GPI) | <u>OP</u> | | Integer (0..Number of PI per frame | Position of PI which is intended for group services in the PICH frame |
| >TDD | | | | |
| >>Channelization code | MD | | Enumerated ((16/1)..(16/16) | Default value is the channelization code which is used by the SCCPCH which transfers the assigned PCH |

FIG 6B

PICH info. (system information)

| Information element | Requirement | Multi | Type and reference | Semantics description |
|---|---|---|---|---|
| >>Timeslot number | MD | | Timeslot number (10.3.6.84) | Default is the timeslot that is used by the SCCPCH which transfers the assigned PCH. |
| >>CHOICE Burst Type | MP | | | |
| >>>Type 1 | | | | |
| >>>>Midamble shift | MP | | Integer (0..15) | |
| >>>Type 2 | | | | |
| >>>>Midamble shift | MP | | Integer (0..5) | |
| >>Repetition period/length | MD | | Enumerated ((4/2), (8/2), (8/4), (16/2), (16/4), 32/2), (32/4), (64/2), (64/4)) | Default is "(64/2)". |

FIG 6C

PICH Info (system information)

| Information element group name | Require-ment | Multi | Type and reference | Semantics description |
|---|---|---|---|---|
| >>Offset | MP | | Integer (0...Repetition period-1) | SFN mod Repetition period=Offset |
| >>Paging Indicator Length | MD | | Integer (4, 8, 16) | Shows the length of a paging indicator in bits. Default is 4. |
| >>$N_{GAP}$ | MD | | Integer (2, 4, 8) | Number of frames between the last frame, which transmits PICH for this paging case and the first frame which transmits paging messages for this paging case. Default is 4. |
| >>$N_{PCH}$ | MD | | Integer (1..8) | Number of paging groups. Default is 2 |

FIG 7

Paging Type 1 (PCH)

| Information element group name | Require-ment | Multi | Type and reference | Semantics description |
|---|---|---|---|---|
| Message Type | MP | | Message Type | |
| UE Information elements | | | | |
| Paging record list | OP | 1 to<max Page 1> | | |
| >Paging record | MP | | Paging record 10.3.3.23 | |
| Other information elements | | | | |
| BCCH modification info | OP | | BCCH modification info 10.3.8.1 | |

FIG 8

Paging cause 1(PCH)

| Information element group name | Requirement | Multi | Type and reference | Semantics description |
|---|---|---|---|---|
| Paging cause | MP | | Enumerated (Terminating Conversational Call, Terminating Streaming Call, Terminating Interactive Call, Terminating Background Call, Terminating High Priority Signaling, Terminating Low Priority Signaling, <u>Terminating Multicast Session</u>,<br><br>Terminating – cause unknown TMS | |

FIG 9A

Paging record (PCH)

| Information element group name | Requirement | Multi | Type and reference | Semantics description |
|---|---|---|---|---|
| CHOICE Used paging identity | MP | | | |
| >CN Identity | MP | | | |
| >>Paging cause | MP | | Paging cause 10.3.2.22 | |
| >>CN Domain identity | MP | | CN Domain identity 10.3.1.1 | |
| >>CHOICE UE Identity | MP | | | |
| >>>IMSI (GSM-MAP) | | | IMSI (GSM-MAP) 10.3.1.5 | |
| >>>TMSI (GSM-MAP) | | | IMSI (GSM-MAP) 10.3.1.17 | |
| >>>P-TMSI (GSM-MAP) | | | P-TMSI (GSM-MAP) 10.3.1.13 | |
| >>>IMSI (DS-41) | | | TIA/EIA/IS-200-4 | |
| >>>TMSI (DS-41) | | | TIA/EIA/IS-200-4 | |

FIG 9B

Paging record (PCH)

| Information element group name | Requirement | Multi | Type and reference | Semantics description |
|---|---|---|---|---|
| >>U-RNTI | MP | | U-RNTI 10.3.3.47 | |
| >>CN originated page to connected mode UE | OP | | | |
| >>>Paging cause | Mp | | Paging cause 10.3.3.22 | |
| >>>CN domain identity | MP | | CN domain identity 10.3.1.1 | |
| >>Paging record type identifier | Mp | | Paging record type identifier 10.3.1.10 | |
| >>Group Identity | OP | | Multicast Group Indicator (e.g. IMGI) | Displays the multicast group for which the incoming message is intended |

FIG 10

Paging cause (PCH)

| Information element group name | Require-ment | Multi | Type and reference | Semantics description |
|---|---|---|---|---|
| Paging cause | MP | | Enumerated (Terminating Conversational Call, Terminating Streaming Call, Terminating Interactive Call, Terminating Background Call, Terminating High Priority Signaling, Terminating Low Priority Signaling, Terminating Multicast Session,<br><br>Terminating – cause unknown PTMS | |

FIG 11

Terminating Multicast Session

| Information element group name | Requirement | Multi | Type and reference | Semantics description |
|---|---|---|---|---|
| Multicast Group Indicator | OP | | Multicast Group Indicator (e.g. IMGI) | Displays the multicast group for which the incoming message is intended |

METHOD, SUBSCRIBER DEVICE AND RADIO COMMUNICATION SYSTEM FOR TRANSMITTING GROUP MESSAGES

CONTINUING DATA

This application is a 371 of PCT/EP02/08735, which was filed on Aug. 5, 2002. Foreign priority is claimed with respect to EP 011190600, which was filed on Aug. 7, 2001.

The object of the invention is to disclose a way in which at least one group of one or more subscriber devices of a radio communication system can be notified in the most efficient manner possible of the presence of at least one group message. This object is achieved by the following inventive method:

Method for notifying at least one group of one or more subscriber devices of a radio communication system of the presence of at least one group message that is to be sent to this group by at least one network element of the radio communication system via at least one radio channel, whereby the presence of this group message is indicated and supplied for evaluation to the subscriber devices of the respective group using a common, additional group paging indicator signal.

It is thereby effectively possible to notify the one or more subscriber devices of a predefinable group jointly using the additional group paging indicator signal that there is at least one group message waiting for this group from at least one network element of the radio communication system for transmission via at least one radio channel. Based on the group paging indicator signal the respective subscriber device can preselect whether it also monitors at least one further radio channel with further information about the group message that is present and to be transmitted. If the waiting group message is not of interest to the respective subscriber device, it is then not necessary for said subscriber device actually to set up a signaling connection via at least one radio channel to at least one network element of the radio communication system. This allows the respective subscriber device to operate in a manner that saves radio resources and energy. For only if the respective subscriber device belongs to the group addressed in that instance does it listen to at least one further radio channel to monitor further information about the waiting group message to be transmitted.

The invention also relates to a subscriber device of a radio communication system that is configured to that it can be operated according to the method according to the invention.

The invention also relates to a radio communication system for implementing the method according to the invention.

Other developments of the invention are set out in the subclaims.

Figure 2:
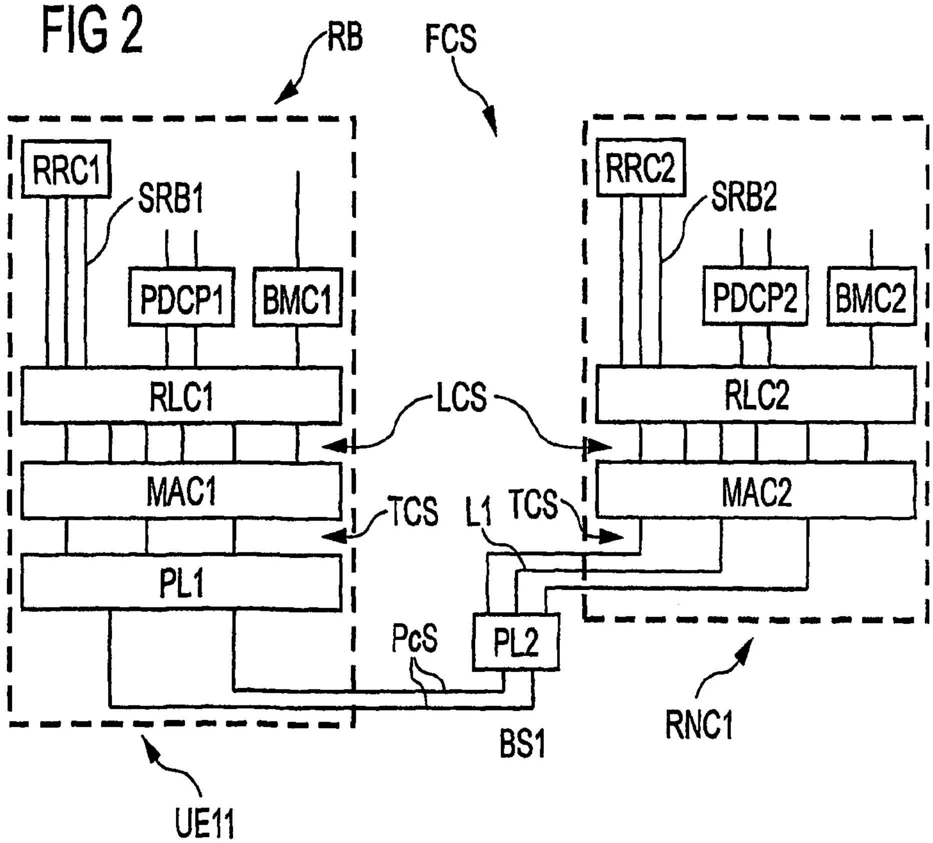
Figure 3:
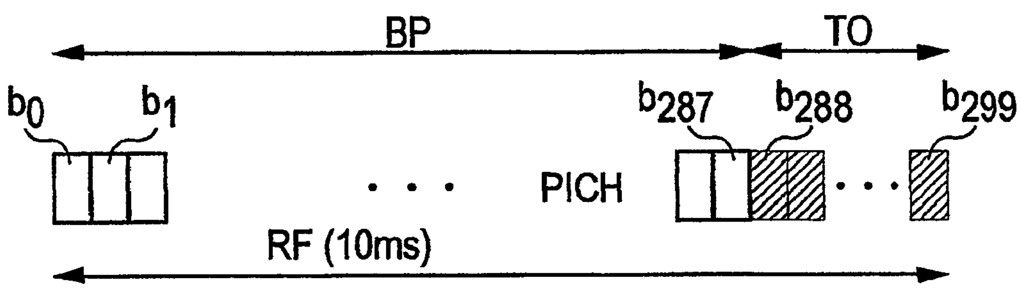
Figure 4:
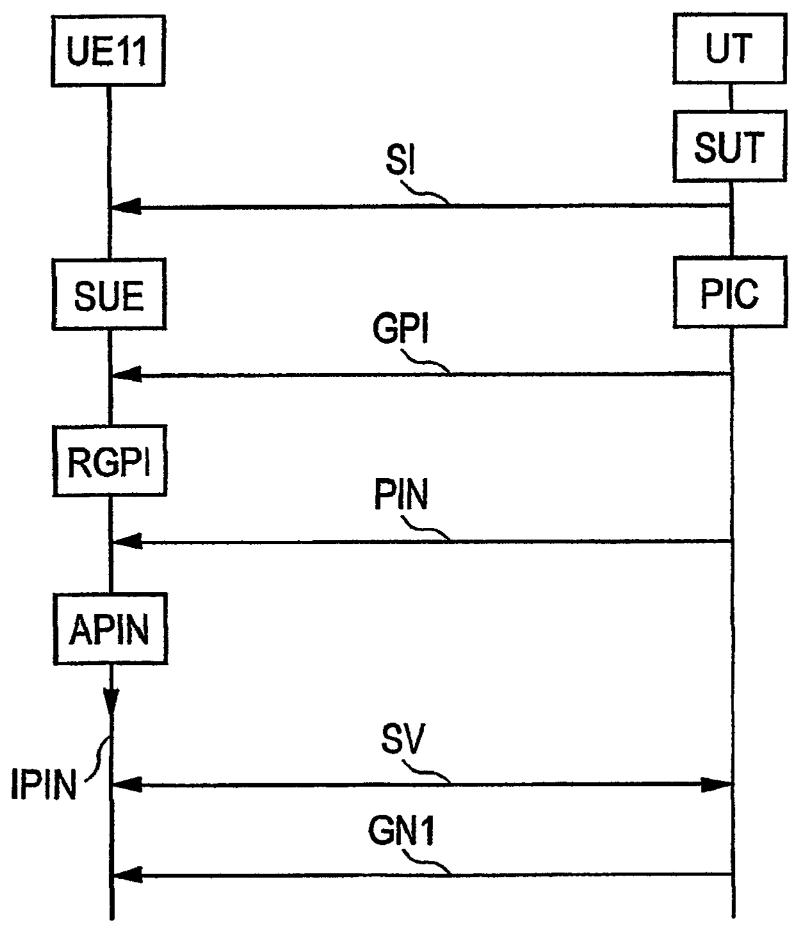

The invention and its developments are described in more detail below with reference to drawings, in which:

FIG. 1 shows a schematic illustration of components of a radio communication system for notifying at least one group of one or more subscriber devices in a manner according to the invention, FIG. 2 shows a schematic illustration of a layer model of the protocols on the air interface between a subscriber device and the competent base station in the radio cell of this subscriber device with the radio communication system according to FIG. 1, in particular according to the UMTS standard, FIG. 3 shows a schematic illustration of the structure or organization of the frame structure of the separate physical radio channel for transmitting a group paging indicator signal for the notification method according to the invention in the radio communication system according to FIG. 1, FIG. 4 shows a schematic illustration of an advantageous signaling sequence for notifying a group of subscriber devices of the radio communication system according to FIG. 1 originating from at least one network component, in particular a base station, of the network-side presence of at least one group message to be transmitted, FIGS. 5A, 5B show a schematic illustration of information elements of the system information that is transmitted between at least one base station of the radio communication system according to FIG. 1 and at least one subscriber device in its radio cell, whereby this system information is extended to include an additional information element, which flags whether a paging channel with information about the group message is multiplexed on what is known as the Secondary Common Control Physical Channel in UMTS (as FIGS. 5A and 5B show complementary tables that are split into two separate figures for greater clarity, reference is only made below to FIG. 5), FIGS. 6A–6C show a schematic illustration of the information element "PICH-info" as a further component of the system information according to FIG. 5, whereby an additional information element also transmits the position of any group paging indicator signal in the frame structure of its radio channel according to FIG. 3 for every subscriber device in every radio cell of the radio communication system concerned by the waiting group message (as FIGS. 6A, 6B and 6C show complementary tables that are split into three separate figures for greater clarity, reference is only made below to FIG. 6), FIGS. 7, 8, 9 show additional information elements according to a first variant of the method according to the invention relating to the nature and cause of the group message that is present and to be transmitted, which are transmitted on a separate radio channel, in particular a paging channel (as FIGS. 9A and 9B show complementary tables that are split into two separate figures for greater clarity, reference is only made below to FIG. 9), and FIGS. 10, 11 show modified information elements of what is known as the paging channel in UMTS that contain further data about the nature, cause and/or specific group, for which the waiting group message is intended.

Elements with the same function and mode of operation are assigned the same reference characters in FIGS. 1 to 11.

FIG. 1 shows a schematic illustration of two exemplary radio cells CE1, CE2 of a radio communication system FCS that is operated in particular according to the UMTS (Universal Mobile Telecommunication System) standard. The radio cell CE1 is thereby stepped up in respect of radio performance by the base station BS1, while the second radio cell CE2 is supplied from the base station BS2. The two base stations BS1, BS2 thereby represent a plurality of further base stations (not shown in FIG. 1) of the radio communication system FCS, which comprise and cover corresponding radio cells. The respective base station is preferably formed by at least one radio transmitter and at least one radio receiver. It preferably comprises at least one transmitter antenna. In addition to or regardless of its function of providing a radio connection to subscriber devices of the radio communication system FCS, the respective base station can in each instance ensure data/message transmission to any available fixed message/data network.

In the radio communication system FCS message/data signals are transmitted via at least one predefined air interface between at least one subscriber device, in particular a mobile radio device, such as a mobile telephone, and at least one base station preferably according to a time multiplex multiple access transmission method. It is preferably configured as a mobile radio system according to the UMTS standard (=Universal Mobile Telecommunication System). In particular it is operated in what is known as FDD (Frequency Division Duplex) mode. In FDD mode separate signal transmission is achieved in the uplink and downlink directions (uplink=signal transmission from the mobile radio device to the respective base station; downlink=signal transmission from the respectively assigned base station to the mobile radio device) by a corresponding separate assignment of frequencies or frequency ranges. A plurality of subscribers in the same radio cell are preferably separated by means of orthogonal codes, in particular according to what is known as the CDMA (Code Division Multiple Access) method.

Mobile radio terminals, in particular mobile telephones, are preferably provided as subscriber devices. Other message and/or data transmission devices, such as for example internet-capable terminals, computers, televisions, notebooks, fax machines, etc. with an assigned radio unit for "on-air" radio communication, i.e. via at least one air interface, can also be components of the radio communication network in the form of subscriber devices. The subscriber devices are thereby present in particular in a mobile or portable manner, i.e. at different locations in the radio network, but can also be of fixed location there in some instances.

In FIG. 1 the two base stations BS1, BS2 are controlled via associated data lines L1, L2 by a higher-order radio network controller RNC1. This monitors the assignment of radio resources in the radio cells CE1, CE2 of the base stations BS1, BS2. In the present exemplary embodiment a plurality of subscriber devices UE11 to UE51 are located in the radio cell CE1 of the base station BS1. At present there are also a number of subscriber devices UE12 to UE 42 in the second radio cell CE2 of the base station BS2. The subscriber devices UE11, UE21, UE31 in the first radio cell CE1 and the subscriber device UE42 in the second radio cell CE2 are assigned beforehand to a predefinable group MC1, for which the receipt of one or a plurality of group messages is to be organized in the most efficient manner possible.

The term "group of subscriber devices" is preferably used in the context of the invention to mean a classification based on technical service, i.e. in particular a categorization based on those subscriber devices that allow multicast transmission or broadcast transmission. The subscriber devices in the radio cells of the radio communication network can also be sorted or classified according to a plurality of other criteria, in particular for example nature of the group message such as for example sport reports, weather forecasts, etc. or reason for origination, etc.

With many services and applications offered in modern mobile radio systems it is particularly desirable to transmit messages not only to one but to two and a plurality of mobile radio subscribers. Examples of such services and applications are news groups, video conferences, video on demand, distributed applications, etc.

One option for transmitting the same message to different subscribers would be to send every recipient subscriber device a copy of the data or messages separately. This method would be simple to implement but would be too expensive for large groups of subscriber devices. As the same message would have to be transmitted via N (N=number of subscriber devices receiving the message) individual connections (=unicast connections), and there would be multiple transmissions via common connection paths, this procedure would require too high a bandwidth.

However what is known as multicast transmission offers a better alternative. Here the different subscriber devices, to which the same message is to be transmitted, are combined in a group (multicast group) and a single common address (multicast address) is assigned to said group. The data to be transmitted is then only sent once to this multicast address. The multicast message to be transmitted in each instance is then ideally only sent once via common connection paths from the respective sender to the recipients, here mobile radio devices in particular. It is then not necessary for the sender to know where and how many recipient subscriber devices are concealed behind the specific multicast address. The subscriber devices that belong in particular to a defined, specific multicast address can advantageously be defined and managed in the network. Also the respective subscriber device can automatically log in with a defined multicast group and/or log off again, subject to the corresponding authorization.

With what is known as broadcast, as a further alternative, messages can be sent to all subscribers within a geographical area. Such an area can for example be defined by a part of the overall radio network. As with multicast, the broadcast message is then ideally sent only once via common connection paths from the sender to the individual recipients. Every subscriber device is preferably registered with a corresponding broadcast group, if it wishes to receive this group's broadcast packets. It can thereby determine for itself whether it wishes to receive or reject all the respective group's broadcast messages or whether it only wishes to receive specific messages.

In order to reduce the power consumption of mobile radio devices, they switch to a type of "idle state" if for example no connection is set up or a connection no longer exists or there are no incoming calls or data. In UMTS this is referred to as idle mode. The respective mobile radio device then only listens to specific channels. Its position is only known "relatively imprecisely" by the network. This means that the network does not know which radio cell the respective mobile radio device is currently located in. If there is then an incoming call or data transmission for such a mobile radio device in idle mode, it is notified of this via specific channels, to which it listens in idle mode, using specific procedures. The mobile radio device then sets up a signaling connection to the radio network, via which the radio resources on the air interface between the currently assigned base station and this mobile radio device are allocated and configured for transmission of the messages.

The layer model of the protocols on the air interface in UMTS is shown in FIG. 2 as an example for the subscriber device UE11 in the radio cell CE1 of the base station BS1. The mobile radio station UE11 comprises a physical layer PL1 that is responsible transmitter-side for processing data for transmission via the air interface via physical channels PCS and receiver-side forwards the received data to the higher Medium Access Control layer MAC1 so that it can be further processed by this layer. On the network side the physical layer PL2 is located in the base station BS1, which is connected via a fixed network connection to the radio network controller RNC1. The connections between the physical layer and the MAC layer are referred to as transport channels and indicate how the data is transmitted (e.g. on general channels that are heard by every mobile radio device in the radio call of the base station or on channels which are only specifically dedicated to a specific mobile station). The MAC layer has tasks such as identification of users, for which a data packet to be transmitted is intended, if it is transmitted on general channels, as well as the mapping of logical radio channels (LCS) onto the transport channels (TCS). For this the MAC layer adds control information on the transmitter side such as for example the identity of the respective mobile station to the data packets to be transmitted, which it has received from a further, higher layer RLC (Radio Link Control). In the mobile radio station UE11 this RLC layer is designated as RLC1. In the base station BS1 this RLC layer has the reference character RLC2. The connections between the respective MAC layer such as for example MAC1 in the subscriber device UE11 and MAC2 in the radio network controller RNC1 and the respectively assigned radio connection control layer RLC1 or RLC2 (Radio Link Control) are designated as logical channels. To map the logical radio channels onto the transport channels, the respective MAC layer adds control information such as the identity of the respective mobile radio station on the transmitter side to the data packets to be transmitted, which it has received from the higher RLC layer in each instance. On the receiver side this control information is evaluated and once again removed from the data packets, before these are forwarded via the logical connections to the RLC layer.

The respective RLC layer RLC1 or RLC2 is responsible in each instance for monitoring the data transmission, i.e. for identifying missing data packets and where appropriate requesting them again. A plurality of units can be defined in the RLC layer. Each RLC unit thereby comprises at least one connection between higher layers and the RLC layer (e.g. Radio Bearer RB). The RLC layer can also add control information on the transmitter side to the packets it has received from higher layers. This control information is used receiver-side for example to determine whether packets are missing. It is removed from the packets before these are forwarded again to the higher layers. Above the RLC layer is the radio resource control layer RRC. This is specifically designated RRC1 at the subscriber device UE11 and RRC2 at the assigned radio network controller RNC1. The RRC layer is responsible in each instance for configuring the layers below it and primarily for setting up connections. Connections between the respective RLC layer and the RRC layer are referred to as SRBs (Signaling Radio Bearers) and are designated as RRC1 for the subscriber device UE11 and SRB2 for the radio network controller RNC1.

What are known as the RBs (Radio Bearers) are also above the respective RLC layer and these are used for the actual data transmission and represent the connection between the RLC layer and the higher application. If data packets are transmitted, what is known as the packet data convergence layer (PDCP=Packet Data Convergence Protocol) is above the respective RLC layer, as for example here PDCP1 for the subscriber device UE11 and PDCP2 for the radio network controller RNC1, which is responsible for example for the compression of IP (Internet Protocol) packets. Also above the RLC layer of the subscriber device UE11 and the radio network controller RNC1 of the base station BS1 respectively is what is known as the Broadcast-Multicast Controller layer BMC1 or BMC2, which is used for the receipt of any cell broadcast messages (CBS messages). A plurality of BMC units can be defined in the respective BMC layer as for the RLC layer.

Subscriber devices (=UEs=User Equipment) can be in different states. These states for example describe whether the respective subscriber device has set up a signaling connection to the network or whether it is in "idle" mode, the channels it is listening to and where it is known in the network:

In RRC state CELL_DH state dedicated resources are assigned to the respective mobile radio station and the mobile radio station is known at cell level, i.e. the network knows in which cell the mobile radio station is located.

In RRC state CELL_FACH state general resources are assigned to the respective mobile station, which it shares with other mobile radio stations. In this state the mobile radio station is also known at cell level.

In RRC state CELL_PCH state the mobile radio station receives broadcast messages from the network and listens to the notification channels PICH (Paging Indicator Channel) and PCH (Paging Channel) via which the network can inform the mobile radio station that messages for example are present for it. In this state the mobile radio station is known at cell level.

The RRC state URA_PCH state is similar to CELL_PCH state except that the radio cell in which the mobile radio station is located is not known precisely to the network but the network only knows the group of cells in which the mobile radio station may be located.

In idle mode the mobile radio station also receives broadcast messages from the network and listens to the notification channels. Unlike URA_PCH and Cell-_PCH states, the radio resource controller RNC however has no knowledge about the mobile radio station itself nor about whether the mobile radio station is located in one of the cells it controls.

Subscriber devices in idle and connected modes (CELL-_DCH and CELL_FACH states) can be informed of different events by means of a specific mechanism. This can for example be an incoming call or the start of a data transmission. The notification mechanism for paging a message awaiting transmission, preferably takes place in two stages. In the first stage the radio network informs the respective mobile radio station by means of an indicator on what is known as the Paging Indicator Channel PICH, i.e. in general terms on a specifically provided, first separate radio channel, that messages are awaiting retrieval and are subsequently transmitted on the Paging Channel PCH, i.e. a further second separate radio channel for the mobile radio station. In the second stage the respective mobile radio station at least partially reads the PCH channel, in which the actual notification, in particular the cause of paging (paging type, paging record, paging cause) is contained. The respective subscriber device identifies from this information whether it is a message that is addressed specifically to it and what sort of a message it is. Only if the subscriber device positively identifies that the message to be transmitted is actually addressed to said subscriber device does it set up a signaling connection to the radio network, via which the radio resources for the transmission of messages are then allocated, i.e. assigned or supplied, and configured.

As far as the paging mechanism is concerned, a distinction is preferably made between two types, which differ in the state of the subscriber device to be notified in each instance:

Paging type 1: This procedure is used to send paging information to specific UEs in idle mode, CELL_PCH or URA_PCH state. What is known as the Paging Control Channel (PCCH) is used as the logical channel for this. Higher layers in the network can initiate paging to initiate the setting up of a signaling connection.

Paging type 2: This procedure is used to transmit dedicated, i.e. specific paging information to a specific subscriber device, UE for short, in connected mode in the CELL_DCH or CELL_FACH state.

In the context of the next exemplary embodiment paging type 1 is of particular interest, as in the case here a group of multicast subscriber devices or mobile radio devices is to be informed about the arrival of multicast messages via a paging indicator without a dedicated connection to the network. In some circumstances the respective subscriber device can also be informed about the arrival of new multicast messages in a similar manner using the same method in connected mode in the CELL_DCH or CELL-_FACH state. The physical radio channel S-CCPCH (Secondary Common Physical Channel) in UMTS transmits information from the transport channel PCH (paging channel) and/or FACH (Forward Access Channel). The Paging Channel PCH is transmitted via the S-CCPCH when a subscriber device is to receive paging information. Common radio channels such as the S-CCPCH, which are provided for all the mobile radio devices currently located in a radio cell, are defined in the system information (SIB 5 and/or 6=System Information Block 5 and/or 6). Every S-CCPCH, which is assigned to a subscriber device in the system information, can preferably contain up to one paging channel PCH. Either one or a plurality of PCHs can be provided in a radio cell. Precisely one paging indicator radio channel PICH is preferably assigned in a defined manner to every PCH. In the event that more than one paging channel PCH (and associated permanently assigned paging indicator radio channel PICH) is defined in the system information, the respective subscriber device selects which paging channel it subsequently listens to, i.e. is switched to ready to receive. For this the respective subscriber device selects one of the enumerated radio channels S-CCPCH, preferably based on the specific International Mobile Subscriber Identity IMSI of the respective subscriber device:

"Index of the selected S-CCPCH"=IMSI mod K, whereby K is the number of S-CCPCHs listed in the system information that transmit a paging channel PCH. In other words, the radio channels S-CCPCH that only transport one FACH radio channel (Forward Access Channel) are not counted. The S-CCPCHs are preferably indexed in the sequence in which they appear in the system information (0 to K-1). The radio channels S-CCPCH that transport a paging channel PCH are listed first in the system information. "Index of the selected S-CCPCH" identifies the selected S-CCPCH with the PCH and assigned PICH that are to be used by the respective subscriber device, for example UE11.

The paging indicator channel PICH is a physical channel that is used to transmit paging indicators. The PICH is preferably always assigned in a defined manner to an S-CCPCH that transmits a PCH transport channel. FIG. 3 shows the organization of the frame structure RF of the PICH for UMTS-FDD mode (Frequency Division Duplex). A PICH frame preferably lasts 10 ms and is in particular 300 bits ($b_0, b_1, \ldots, b_{299}$) long. The first 288 bits of these ($b_0, b_1, \ldots, b_{287}$) are used to transmit paging indicators. The remaining 12 bits are therefore not formally part of the PICH and are not to be transmitted. This part of the PICH frame is reserved for future applications. So while a first subsection BP of the frame structure RF of the transport channel PCCH is pre-reserved for paging indicators, a second subsection TO, at the end in this instance, remains free. $N_p$ ($N_p$=18, 36, 72 or 144) paging indicators are transmitted in each PICH frame. Higher protocol layers in the transmitter/receiver unit of the respective subscriber device and/or the respectively assigned base station or its allocated radio network controller hereby expediently calculate which of the paging indicators ($P_q$) is assigned to which UE. The index, q' thereby specifies the position within the respective PICH frame and is preferably calculated as:

$$q=\left(PI+\left\lfloor((18x(SFN+\lfloor SFN/8\rfloor+\lfloor SFN/64\rfloor+\lfloor SFN/512\rfloor))\bmod 144)x\frac{N_p}{144}\right\rfloor\right)\bmod N_p$$

'PI' is hereby calculated in particular by higher layers for each UE as:

PI=(IMSI div 8192) mod Np [3GPP TR 25.304]

SFN here is the System Frame Number of the P-CCPCH (Primary CCPCH), during which the PICH appears. Because q is a function of SFN, the position of the paging indicator assigned to a UE changes constantly. The IMSI (International Mobile Subscriber Identity) is assigned to every mobile radio device and identifies said device uniquely.

If a paging indicator in a specific PICH frame is set to logical "1", the subscriber device (=UE) assigned to this paging indicator then reads the PCH of the corresponding S-CCPCH.

Once a subscriber device has been informed of a new event using the paging indicator on the PICH, it will expediently wish to know the specific cause of this. This is particularly advantageous, as it can be that during the calculation to establish which paging indicator within a PICH frame is assigned to which UE, two or more UEs are listening to the same paging indicator. The respective subscriber device learns whether the paging is specifically intended for the respective subscriber device and what the specific cause of paging is, by reading the various information elements that are transmitted on the paging channel (PCH), which in turn is mapped onto the previously specified S-CCPCH:

First the subscriber device concerned in each instance reads the information element 'Paging Type 1' according to FIG. 7 on the respectively assigned PCH. This informs it among other things of how many "initiators" there are for paging. It also contains a reference to the information element 'Paging Record' according to FIG. 8. This information element provides it among other things with the information whether the event announced by paging is intended for it or for another subscriber device. It also receives a reference to the information element 'Paging Cause' according to FIG. 9, in which the precise cause of paging is described. This can for example be an incoming call or the start of a data transmission. The information elements shown in FIGS. 7, 8 and 9 with the member elements not underlined, i.e. flagged separately, are in particular already specified according to the 3GPP specification [3GPP TS 25.331].

As disclosed above, the respective subscriber device now knows the cause of notification and sets up a signaling connection to the network, by means of which corresponding resources are then supplied to transmit the message or data.

According to the prior art, mobile radio devices, which are to be informed about the arrival of a message or an incoming call, the start of a transmission of data or similar initiators, have hitherto been notified in a dedicated manner, i.e. a manner specific to the mobile radio devices by means of what is known as paging.

With different services and applications messages often have to be transmitted not only to one but to two and a plurality of mobile radio subscribers. This is generally the case with multicast and specifically in UMTS in particular with the multimedia broadcast/multicast service (MBMS). Reference is made below to a "group service", whereby one 'group service' can contain a plurality of groups (e.g. lotto, exchange rates, weather, etc.) or classes.

According to the prior art, subscribers to such 'group services' would have to be informed about incoming messages in a dedicated manner, i.e. by means of individual paging indicators assigned to the mobile radio devices (=1 paging indicator per mobile radio device). If for example there were 50 mobile radio devices in one radio cell, which were all registered with the same group for a 'group service', they would be informed of the arrival of a corresponding message by means of 50 specific paging indicators.

The core of the principle according to the invention is however the introduction of a group paging indicator for 'group services', with which a message is to be sent to a group of subscribers, in particular multicast services.

Advantageously this group paging indicator is used to inform a group of one or preferably a plurality of mobile radio devices, which wish for example to receive specific services (with which one message is to be sent to a group of subscribers (in particular multicast services)) about the arrival of such group messages or similar initiators.

Unlike the prior art, this 'group paging indicator' is therefore not specifically assigned to an individual subscriber device but to a group of one or a plurality of subscriber devices. These subscriber devices or UEs thereby expediently have in common that they all use the same 'group service', in particular a multicast service. This means that they belong to at least one group of recipients of a specific 'group service' in particular a multicast service (=only 1 paging indicator per service, in particular a multicast service).

The following stages are expedient to ensure group paging:

- In a first stage the respective mobile radio device (UE), which is registered with a 'group service' in particular a multicast service, determines which of the S-CCPCHs of a radio cell, which transport a PCH, it should expediently listen to.
- In a second stage a group paging indicator is defined within a PICH frame and is assigned to the respective group of mobile radio devices (UEs), which belong to a 'group service', in particular a multicast service.
- In a third stage already available information elements, from which a mobile radio device gets to know the cause of paging, are preferably extended so that a mobile radio device gets to know from them for example the multicast group for which a message has been stored. These information elements can also contain further information.

The respective subscriber device receives information from the system information about the S-CCPCHs that are provided in a radio cell and whether these transport a PCH. A PICH is preferably permanently assigned to every S-CCPCH. The subscriber device determines or then calculates which S-CCPCH/PCH and PICH it should expediently listen to and which group paging indicator of a PICH frame is assigned to a 'group service', in particular a multicast service.

After receiving a 'group paging indicator', in particular a multicast paging indicator, that is transmitted on the PICH, the mobile radio device then expediently listens to the assigned PCH. Information elements are then transmitted on the PCH that advantageously contain information about the group, in particular the multicast group, to which the received message is addressed (see information elements Paging Type 1, Paging Record, Paging Cause in FIGS. 7, 8, 9). If a mobile radio device belongs to the corresponding group, a signaling connection is then set up to the mobile radio network, via which the resources for transmission of the message are allocated.

All mobile radio devices are thereby advantageously notified by a common 'group paging indicator' of the arrival of a group message, in particular a multicast message. According to the prior art N (N=number of MC subscribers in the radio cell) paging indicators would have to be used, which would be too expensive and too inefficient.

An expedient sequence of the method according to the invention for notifying a group of recipients by means of a common 'group paging indicator' is shown in FIG. 4:

The respective subscriber device (=UE, here UE11) receives system information SI from at least one component, in particular a base station of the radio network UT (in UMTS this is UTRAN=Universal Terrestrial Radio Access Network) and reads from this which S-CCPCHs are transmitted in the radio cell and which of these S-CCPCHs transmit a PCH. A PICH is permanently assigned to every S-CCPCH that transmits a PCH. In a stage SUT beforehand the network determines the S-CCPCH on which group information should be transmitted. In a corresponding stage SUE the UE determines which of the S-CCPCHs/PCHs and associated PICHs it should expediently listen to. Possible variants for such determination are specified in a subsequent section.

If transmission of a group message GN1 for a 'group service' group is impending, in a stage PIC the network (in particular UTRAN) UT sends a corresponding group paging indicator signal GPI on the previously selected PICH. All UEs that are registered with a 'group service' group read this group paging indicator signal GPI in the next stage RGPI and identify that a group message GN1 is to be transmitted. The group paging indicator within a PICH frame assigned specifically to the respective 'group service' is determined beforehand in the network and in the UEs. Possible variants of this are specified in a subsequent section.

In order to establish whether the incoming group message in each instance specifically concerns the respective subscriber device, because it is a member of the corresponding group, in a further stage APIN said subscriber device reads the paging information PIN (in particular the information elements Paging Type 1, Paging Record and Paging Cause according to FIGS. 7 to 9), which are transmitted on the PCH. The field or information element Paging Record contains among other things in particular a group identity GI (see FIG. 9), which identifies a specific 'group service' group. Further possible variants are specified in subsequent sections.

If the respective subscriber device identifies from the transmitted paging information PIN that the waiting or incoming group message GN1 is not of interest to it, it reverts to the state it was in beforehand. If the UE identifies that the incoming group message GN1 is of interest to it, it sets up a signaling connection SV, via which the resources for the subsequent transmission of the group message are allocated and configured.

There are different options for determining the S-CCPCH or PCH and assigned PICH on which a subscriber device that is registered with a 'group service' receives signaling data:

In easily the most expedient variant all UEs that are registered with a 'group service' listen to the same S-CCPCH. The information about which S-CCPCH the UEs have to listen to, is thereby contained in the system information (SIB 5/6). The system information is expediently extended to include additional information elements for this purpose. FIG. 5 shows this using the example of the information element "secondary CCPCH system information" [3GPP TS 25.331, chapter 10.3.6.72] that is transmitted in SIB 5 and 6. Compared with the prior art what is known as a "Group Service Indicator" is added that specifies whether and which S-CCPCH that transports a PCH (and associated PICH) is used for the transmission of 'group service' information. The changes compared with the prior art are flagged.

A further option is for the same predefined S-CCPCH always to be used for the transmission of information concerning a recipient group. This can for example always be the first or last of the S-CCPCHs defined in the system information. The assigned PICH transmits the group paging indicator. The S-CCPCH transmits the PCH, via which information about the cause of paging is preferably transmitted.

UEs that are registered for a 'group service' all listen to the same S-CCPCH. The S-CCPCH it has to listen to is calculated in the higher layers of a UE. A 'group service' identity is advantageously used for this calculation and this is expediently known or made known to the corresponding UEs. When a group-specific (not 'group service'-specific) identity such as for example the IMGI (International Mobile Group Identifier) is used, when calculating the respectively assigned S-CCPCH it is expediently ensured that, despite different group identities of the same 'group service', the same S-CCPCH (and associated PICH) is calculated for all UEs. In the event that UEs calculate different S-CCPCHs for the transmission of 'group paging' information, the corresponding information is expediently transmitted on each of these S-CCPCHs. The assigned PICH transmits the group paging indicator, for example GPI1. The S-CCPCH transmits the PCH, via which information is transmitted about the cause of paging.

'Group service' information is transmitted on all S-CCPCHs transmitted in a radio cell that transmit PCHs. This means that the 'group paging indicators' are transmitted on all assigned PICHs. Therefore information about the cause of paging is advantageously transmitted on all PCHs, which nevertheless necessitates a high level of redundancy.

The following options are expedient for selecting a group paging indicator within a PICH frame, in order to be able to signal to the subscriber devices of an addressed, concerned group about events relating to a 'group service' or another waiting group message (e.g. incoming message, etc.):

If a group paging indicator is used for all the groups of a 'group service', a UE is then informed when a message arrives that said message is now present. Two further secondary options should also be considered here:

If one group paging indicator is used per 'group service' group, a UE that is registered with the 'group service' can already identify from this group paging indicator whether the message is of interest (disadvantage: a large number of group paging indicators are required for a large number of multicast (MC) groups).

If one group paging indicator is used for specific MC groups (subgroup of all MC groups of a 'group service') a UE that is registered with the 'group service' can use the group paging indicator to pre-select whether the incoming message is specifically for it, i.e. of interest to it. The subscriber device only gets to know from the paging cause which group the message is actually intended for.

When calculating or determining which paging indicators within a PICH frame are used for which 'group services', it can be expedient for other UEs listening to the same PICH to be assigned the same group paging indicator as infrequently as possible. This applies both to UEs associated with other 'group services' and UEs registered with no 'group service'. This has the advantage of increasing the efficiency of the method.

This can for example be achieved by sending paging information for different MC services and groups on different PICHs and PCHs.

using different DRX cycles for PICHs that transmit 'group paging indicators' and PICHs that do not transmit 'group paging indicators'. PICHs are not received by UEs in every frame but at regular intervals known as DRX cycles (e.g. to save energy). Using different DRX cycles for PICHs with and without 'group paging indicators' means that "duplicated allocation" of paging indicators can be prevented.

However if the same paging indicator is assigned to two or more UEs, it is expedient for these UEs to read the cause of paging and for whom the event is actually of interest from corresponding information elements.

Which group paging indicator within a PICH frame is assigned to which 'group service' is preferably calculated or determined by higher layers.

To calculate the positions 'q' of the respective group paging indicator, for example GPI1, a group identity (e.g. IMGI, International Mobile Group Identity) for example can be used. The formula for calculating 'GPI1' could then be as follows:

$$GPI1=(IMGI \text{ div } 8192) \bmod Np$$

Another option is always to use the same predefined group paging indicator for 'group service' purposes. For example this can always be the first or last group paging indicator in a PICH frame or any other. The group paging indicator within a PICH frame reserved for 'group services' can for example be made known by extending corresponding information elements.

In FIG. 6 the information element 'PICH info' [3GPP TS 25.331, chapter 10.3.6.49] is extended to include further information GPI with the name 'Group PI'. This information element specifies the position of a group paging indicator within a PICH frame that is assigned to a 'group service'. For this exemplary embodiment the change is only applied for example for FDD (Frequency Division Duplex). Changes compared with the prior art are flagged by underlining the additional information signals.

It would also be possible to use the as yet unused bits TO of a PICH frame (see FIG. 3) for 'group service' purposes.

Extending the information elements responsible for paging advantageously allows the cause of paging to be indicated on the one hand as well as the 'group services' group to which the paging relates. This should be demonstrated below in the multicast services example.

One option is to extend the information element 'Paging Record' [3GPP TS 25.331, chapter 10.3.3.23] in FIG. 9 to include an additional element GI ("Multicast Group Identity"), in which the multicast group of the 'multicast service' is then identified. Also the 'Paging Record' refers to the information element 'Paging Cause' [3GPP TS 25.331, chapter 10.3.3.22] that is expediently extended to include an additional element TMS ("Terminating Multicast Session") that specifies the cause of paging, i.e. the start of a multicast transmission (see FIG. 9). The changes compared with the prior art are flagged in each instance by underlining the respective additional information signal.

A further option is for a UE, when reading the information element 'Paging Cause' that as described above according to the invention contains an additional element "Terminating Multicast Session", to receive a reference PMTS according to FIG. 10 to a further new information element "Terminating Multicast Session". In this information element the multicast group, for which the incoming message is intended, is shown by a multicast group indicator GI. The changes compared with the prior art are flagged. The information element 'Paging Record' does not need to be changed here, compared with the first option described.

It can also be expedient in some instances to include in the system information signals (see FIG. 5) of the radio communication system emitted by at least one of the latter's network elements at least one indicator signal, for example GSI, showing on which of the radio channels, in particular Secondary Common Control Physical Channels, at least one transport channel (PCH) is transmitted with information about the group message to be transmitted in each instance.

The following acronyms are used in the disclosure as listed below. (The plural is essentially formed by appending an 's', e.g. one RB, two RBs)

BMC Broadcast/Multicast Control
DCH Dedicated Channel
DRX Discontinuous Reception
FACH Forward Access Channel
FDD Frequency Division Duplex
IMSI International Mobile Subscriber Identity
IP Internet Protocol
MAC Medium Access Control
MC Multicast
MS Mobile Station
P-CCPCH Primary Common Control Physical Channel
PCH Paging Channel
PDCP Packet Data Convergence Protocol
PI Paging Indicator
PICH Paging Indicator Channel
RB Radio Bearer
RLC Radio Link Control
RRC Radio Resource Control
S-CCPCH Secondary Common Control Physical Channel
SFN System Frame Number
SRB Signaling Radio Bearer
UE User Equipment
UMTS Universal Mobile Telecommunication System
URA UMTS Routing Area

The invention claimed is:

1. A method for notifying at least one group of one or more subscriber devices of a radio communication system of the presence of at least one group message, comprising:

initiating a group message to said at least one group to be transmitted from at least one base station of the radio communication system via at least one radio channel, establishing a common group paging indicator signal when said group message is received, wherein said paging indicator signal provides said group message signal to one or more subscriber devices in said at least one group, wherein the common group paging indicator signal is transmitted via a first separate, physical radio channel by at least one base station to the one or more subscriber devices of the respective group;

transmitting at least one information signal with paging information via at least one second, separate radio channel from said at least one base station about the nature of the group message to be transmitted, the paging cause for this group message and/or which specific recipient group of subscriber devices, to which the respective group message is addressed;

wherein the first separate radio channel for the group paging indicator signal is assigned in a unique manner to the second separate radio channel with information about the respective group message.

2. The method according to claim 1, wherein the second separate radio channel is transmitted as a component of a further radio channel, in particular a Secondary Common Control Physical Channel (S-CCPCH).

3. The method according to claim 1, wherein at least one indicator signal is included in system information signals of the radio communication system emitted by at least one of the latter's base station showing on which of the radio channels, in particular the Secondary Common Control Physical Channels, at least one transport channel is transmitted with information about the respective group message to be transmitted.

4. The method according to claim 3, wherein the system information signals are extended to include an additional information element by which a portion of a group paging indicator signal within the first radio channel is specified.

5. The method according to claim 1, wherein the radio communication system is operated according to the UMTS (Universal Mobile Telecommunication System) standard.

6. The method according to claim 1, wherein a respective base station notifies the subscriber devices of the respective group beforehand by means of at least one information signal on which first radio channel the group paging indicator signal is sent and/or on which second radio channel further paging information about the type, the paging cause and/or the specific recipient group of group message to be transmitted is sent.

7. The method according to claim 1, wherein a first and second radio channel is specifically pre-allocated respectively for the transmission of the group paging indicator signal and/or further information about the group message to be transmitted.

8. The method according to claim 1, wherein one specific radio channel is allocated in the respective subscriber device itself and/or by at least one base station for the transmission of the group paging indicator signal and/or further paging information about the group message (GN1) to be transmitted.

9. The method according to claim 1, wherein a mobile radio device is used as the subscriber device.

* * * * *